US012619354B2

(12) United States Patent
Benisty et al.

(10) Patent No.: US 12,619,354 B2
(45) Date of Patent: May 5, 2026

(54) BALANCED TRANSFERS ON INTERFACES

(71) Applicant: Sandisk Technologies, Inc., Milpitas, CA (US)

(72) Inventors: Shay Benisty, Beer Sheva (IL); Amir Segev, Meiter (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/904,530

(22) Filed: Oct. 2, 2024

(65) Prior Publication Data

US 2026/0093396 A1      Apr. 2, 2026

(51) Int. Cl.
    *G06F 3/06*            (2006.01)
(52) U.S. Cl.
    CPC .......... *G06F 3/0604* (2013.01); *G06F 3/0656* (2013.01); *G06F 3/0659* (2013.01); *G06F 3/0679* (2013.01)
(58) Field of Classification Search
    CPC .... G06F 3/0604; G06F 3/0679; G06F 3/0656; G06F 3/0659
    See application file for complete search history.

(56) References Cited

U.S. PATENT DOCUMENTS

| | | | |
|---|---|---|---|
| 8,310,876 B2 | 11/2012 | Yoo et al. | |
| 11,429,444 B1 * | 8/2022 | Rahul ................. | G06F 13/1668 |
| 11,734,207 B1 | 8/2023 | Benisty et al. | |
| 11,768,606 B2 | 9/2023 | Segev et al. | |
| 11,841,819 B2 | 12/2023 | Jeon | |
| 11,861,224 B2 | 1/2024 | Benisty | |
| 2014/0198653 A1 * | 7/2014 | Dalal .................... | G06F 13/362 |
| | | | 370/235 |
| 2017/0344480 A1 * | 11/2017 | Beard ................. | G06F 12/0815 |
| 2019/0250858 A1 * | 8/2019 | Yun ........................ | G06F 3/0656 |
| 2019/0377516 A1 * | 12/2019 | Rao ........................ | G06F 3/0683 |
| 2022/0113905 A1 * | 4/2022 | Agarwal .............. | G06F 3/0631 |
| 2022/0391136 A1 * | 12/2022 | Veluswamy .......... | G06F 3/0659 |
| 2023/0069152 A1 * | 3/2023 | Akkawi ............. | G06F 13/1668 |
| 2024/0211174 A1 * | 6/2024 | Shin ..................... | G06F 3/0673 |
| 2024/0393954 A1 * | 11/2024 | Dhatchinamoorthy ..................... | |
| | | | G06F 3/0659 |
| 2024/0419359 A1 * | 12/2024 | Nagai ................... | G06F 3/0679 |
| 2025/0086025 A1 * | 3/2025 | Lee ....................... | G06F 9/5077 |

* cited by examiner

*Primary Examiner* — Mark A Giardino, Jr.

(74) *Attorney, Agent, or Firm* — Patterson + Sheridan, LLP

(57)                ABSTRACT

Randomly sending transactions across an interface can lead to idle interfaces and generally inefficient operations. Re-ordering transactions or data packets involves potentially changing the order of packet transmission to host devices. The re-ordering can ensure that each interface between a host device and the data storage device is saturated. The saturation is achieved by the re-ordering so that packet transmission is balanced across the interfaces. The balancing may be based on any number of factors such as namespace identification (ID), zone ID in a zoned namespace (ZNS) drive, submission and completion IDs, physical and virtual functions, and host addresses to name a few. The re-ordering and hence balancing results in packet level fairness and enables integration of asymmetric systems. In so doing, performance is optimized, reliability is maintained, and scalability is supported.

19 Claims, 7 Drawing Sheets

700

BALANCED TRANSFERS ON INTERFACES

BACKGROUND OF THE DISCLOSURE

Field of the Disclosure

Embodiments of the present disclosure generally relate to improving traffic balancing across interfaces.

Description of the Related Art

Non-volatile memory (NVM) express (NVMe) solid state drives (SSDs) are connected to host devices through a peripheral component interconnect (PCI) express (PCIe) interface. The interface is used to satisfy the NVMe protocol, while trying to reach maximum performance. To service host commands, the NVMe needs to use the interface for different tasks: reading commands, reading pointers, reading data, and on some products reading mapping tables.

Traffic balancing in the context of storage devices using PCIe and NVMe interfaces optimizes performance, improves efficiency, and ensures equitable utilization of resources. Some of the key reasons for why traffic balancing is important include optimizing throughput, avoiding bottlenecks, utilizing multiple lanes efficiently, enhancing scalability, improving reliability, reducing latency, maximizing NVMe parallelism, supporting dynamic workloads, and meeting application demands.

In summary, traffic balancing in PCIe and NVMe-based storage systems optimizes performance, maintains reliability, and supports scalability. Traffic balancing ensures that the full capabilities of high-speed interfaces are leveraged efficiently, contributing to an overall responsive and reliable storage infrastructure. Achieving the traffic balancing, however, is always a challenge.

Therefore, there is a need in the art for improved traffic balancing across interfaces.

SUMMARY OF THE DISCLOSURE

Randomly sending transactions across an interface can lead to idle interfaces and generally inefficient operations. Re-ordering transactions or data packets involves potentially changing the order of packet transmission to host devices. The re-ordering can ensure that each interface between a host device and the data storage device is saturated. The saturation is achieved by the re-ordering so that packet transmission is balanced across the interfaces. The balancing may be based on any number of factors such as namespace identification (ID), zone ID in a zoned namespace (ZNS) drive, submission and completion IDs, physical and virtual functions, and host addresses to name a few. The re-ordering and hence balancing results in packet level fairness and enables integration of asymmetric systems. In so doing, performance is optimized, reliability is maintained, and scalability is supported.

In one embodiment, a data storage device comprises: a memory device; and a controller coupled to the memory device, wherein the controller is configured to: classify transactions that are to be sent to one or more host devices, wherein the transactions are at a packet level; re-order the transactions based upon the classifications; and transmit the re-ordered transactions to the one or more host devices.

In another embodiment, a data storage device comprises: a memory device; and a controller coupled to the memory device, wherein the controller comprises: a host interface module (HIM) comprising a re-ordering buffer and a completion and interrupt sync module, wherein the HIM is configured to maintain a first interface between the controller and a first host device, wherein the HIM is configured to maintain a second interface between the controller and a second host device; a flash interface module (FIM) coupled to the memory device; and a command scheduler coupled between the HIM and FIM, wherein the controller is configured to: balance traffic between the first host device and the second host device, wherein the balancing comprises ensuring that the first interface and the second interface are saturated.

In another embodiment, a data storage device comprises: means to store data; and a controller coupled to the means to store data, wherein the controller is configured to: receive a transaction packet from the means to storage data; classify the transaction packet; place the transaction packet in a queue of a plurality of queues; send the transaction packet to a host device; and maintain saturation on an interface between the controller and the host device and interfaces between the controller and other host devices.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Randomly sending transactions across an interface can lead to idle interfaces and generally inefficient operations. Re-ordering transactions or data packets involves potentially changing the order of packet transmission to host devices. The re-ordering can ensure that each interface between a host device and the data storage device is saturated. The saturation is achieved by the re-ordering so that packet transmission is balanced across the interfaces. The balancing may be based on any number of factors such as namespace identification (ID), zone ID in a zoned namespace (ZNS) drive, submission and completion IDs, physical and virtual functions, and host addresses to name a few. The re-ordering and hence balancing results in packet level fairness and enables integration of asymmetric systems. In so doing, performance is optimized, reliability is maintained, and scalability is supported.

Figure 1:
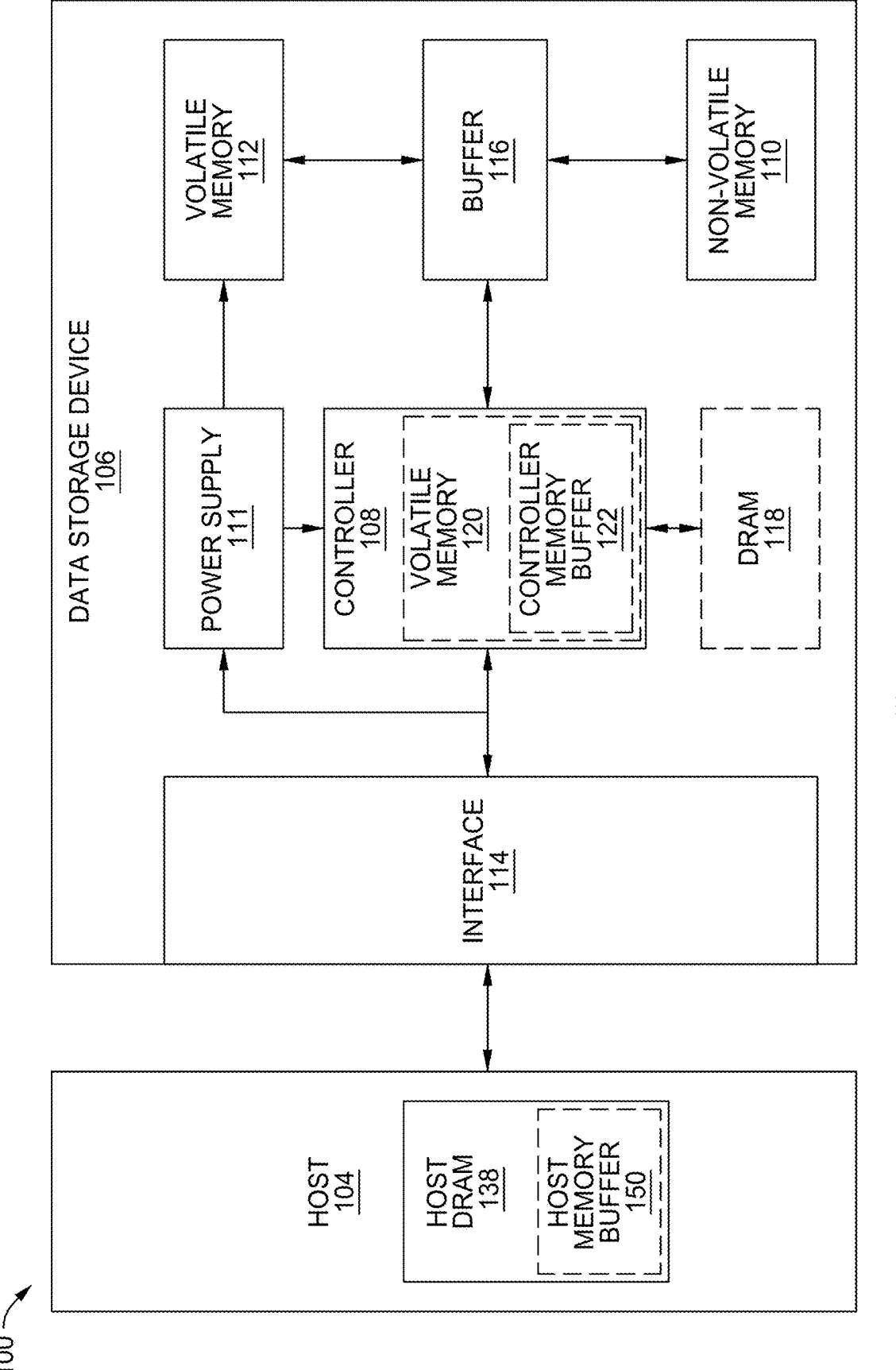
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

As noted above, traffic balancing has numerous benefits. For example, for optimizing throughput, PCIe and NVMe interfaces are designed to provide high-speed data transfer between the data storage device and the host device. Traffic balancing helps distribute data traffic evenly across multiple lanes or channels, maximizing the overall throughput of the data storage system.

For avoiding bottlenecks, uneven distribution of data traffic can lead to bottlenecks in certain lanes or channels. Traffic balancing helps prevent congestion and ensures that no single lane becomes a limiting factor, allowing the data storage device to operate at the data storage device's full potential.

For utilizing multiple lanes efficiently, PCIe-based data storage devices often have multiple lanes or channels to support parallel data transfer. Traffic balancing ensures that each lane is utilized efficiently, avoiding situations where some lanes are underutilized while others are overloaded.

For enhancing scalability, as storage systems scale in terms of capacity and performance, traffic balancing becomes increasingly important. Traffic balancing allows the storage infrastructure to scale horizontally, utilizing multiple PCIe/NVMe devices concurrently while maintaining optimal performance.

For improving reliability, traffic balancing contributes to the reliability of the storage system by preventing uneven wear and tear on different components. Balanced traffic distribution reduces the likelihood of hotspots, where specific components may experience excessive usage.

For reducing latency, in data storage systems, minimizing latency is beneficial for responsiveness. Traffic balancing ensures that data is distributed evenly, preventing scenarios where some data paths experience higher latency due to congestion.

For maximizing NVMe parallelism, NVMe is designed to take advantage of parallelism inherent in memory, particularly NAND flash. Proper traffic balancing enables the efficient use of NVMe queues and parallelism, ensuring that multiple input/output (I/O) operations can be processed concurrently.

For supporting dynamic workloads, storage workloads can vary dynamically, and traffic balancing allows the data storage system to adapt to changing conditions. Traffic balancing ensures that the data storage device can handle varying levels of read and write requests without creating performance imbalances.

For meeting application demands, different applications and workloads have varying demands on storage performance. Traffic balancing helps meet the specific requirements of diverse applications, allowing the storage infrastructure to support a wide range of use cases.

The disclosure herein addresses the problem of achieving balanced transfers on the packet level which is beneficial some specific applications. For instance, traffic balancing is beneficial in multi-host asymmetric systems when the performance of each host device has a different maximum performance.

Figure 2:
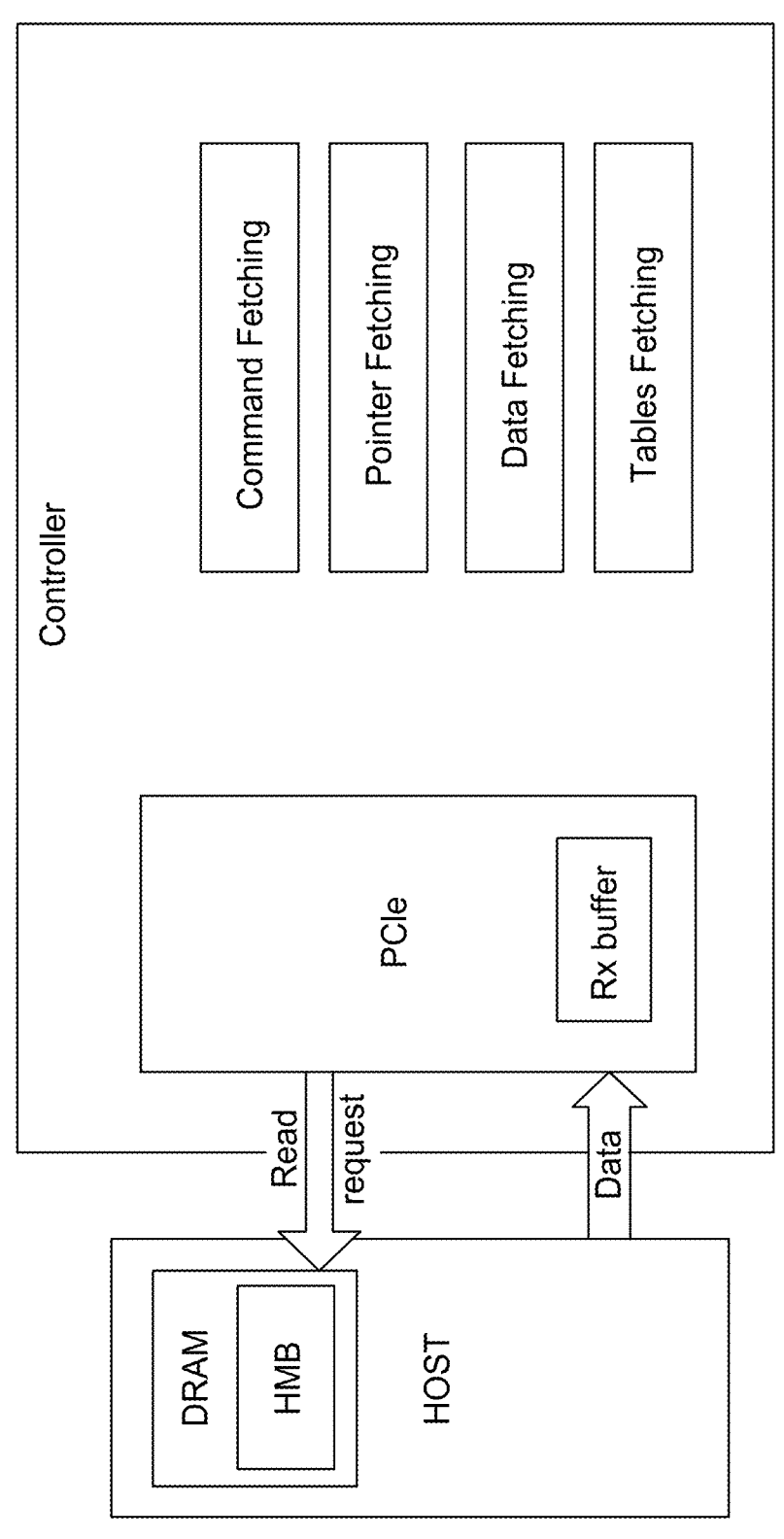
FIG. 2 is a schematic illustration of a non-volatile memory (NVM) express (NVMe) solid state drive (SSD) system according to one embodiment.

FIG. 2 is a schematic illustration of a NVMe SSD system 200 according to one embodiment. In general, the system 200 includes a host device and a data storage device. The host device comprises local DRAM having HMB. The data storage device includes a controller having a PCIe interface. The interface has a buffer for data storage. The controller is responsible for command fetching, pointer fetching, data fetching, and table fetching, among other things.

More specifically, the data storage device uses an NVMe over a PCIe interface. The interface is between the host device and the data storage device and, in general, for the NVMe protocol, there are several types of transfers that issue on the interface such as fetching commands or the pointers for the data. There is also the data transfer of the user data itself, and potentially L2P tables or some other tables that are stored in the HMB. The disclosure will discuss having balanced transfers over the host interface between command fetching, pointer fetching, data fetching, table fetching, and other transfers in order to maximize the performance.

If the interface is used just for data fetching, there might be a scenario where there are not enough commands in the data storage device and thus the interface with the memory device (e.g., NAND) will not be saturated. Because the interface is always busy with just data transfer there is a need to have balance and a need to avoid bottlenecks. The goal is to figure out how to have better balance over the interface between the several types of transfers that occur in order to maximize the performance. Generally speaking, the disclosure is more relevant for a multi-host interfaces, and the focus is on the low level packets. However, it is to be understood that the disclosure is relevant to a single host interface, particularly where the single host comprises one or more virtual functions and/or physical functions.

Figure 3:
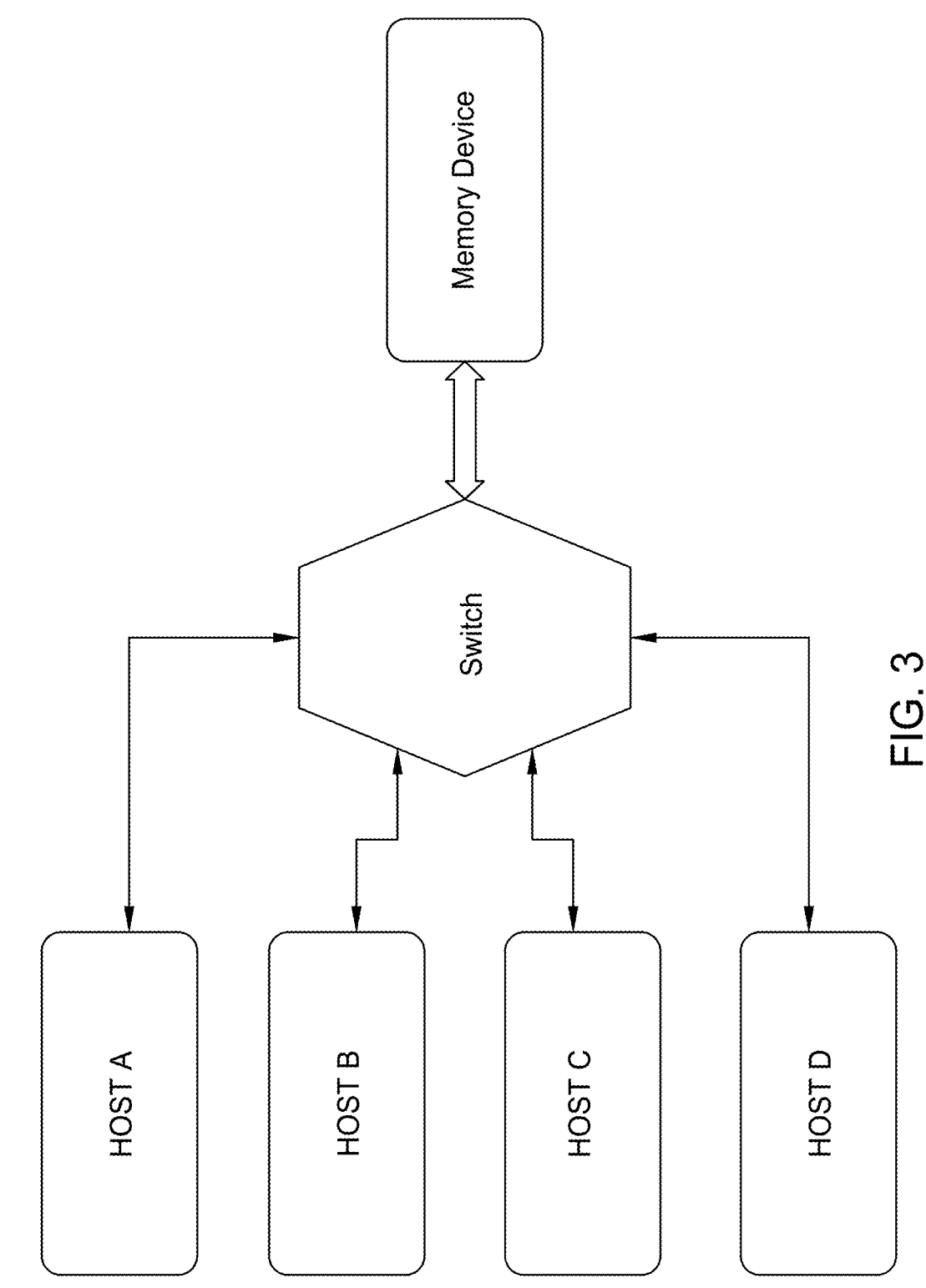
FIG. 3 is a schematic illustration of a multi-tenant system according to one embodiment.

The disclosure discusses a reordering logic that is responsible for balancing the traffic over the interface making sure that each interface is fully saturated. The balancing could be based on namespace ID, Zone ID in a ZNS drive, submission and completion IDs, PCIe physical and virtual functions, and/or host addresses. It is to be understood that the balancing can be based on other criteria as well. A special logic is used in order to synchronize the completion and interrupt messages towards the host device. Fairness in packet level processing may be achieved by the disclosure. The balancing enables the integration of asymmetric systems and is beneficial for optimizing performance, maintaining reliability, and supporting scalability. FIG. 3 depicts the concept of such a system.

FIG. 3 is a schematic illustration 300 of a multi-tenant system according to one embodiment. A single memory device is connected to multiple host systems via a switch. The memory device is connected to the switch using a single port interface. The maximum throughput on the interface between memory device and the switch is greater than the throughput on the interface between a specific host device to the switch. In a balanced system, the interface between the memory device and the switch is equal to the total throughput on the interfaces between all host devices and the switch. The data storage device needs to make sure the interface of each host device is fully saturated.

In the example of FIG. 3, there are four host devices. There is a switch between the host devices and the data storage device. There might be a scenario, for example, where the interface between the memory device and the switch could be generation five with four lanes and the interface between Host A and the switch could be something else. The interface could be also generation five by four, but just for example, the interface could be generation five by one or something else. There could be any speed running in the interface. The different interfaces should be taken into account when considering maximizing the performance. Thus, the data storage device also needs to make sure that there are enough tasks or activities or transfers over all interfaces. It is not enough to just make sure that one interface is saturated because there might be a scenario that one host interface could be saturated while all the other host devices would be an idle state, which is not good. All interfaces should be saturated for efficient operations, not just one or a few interfaces.

Figure 4:
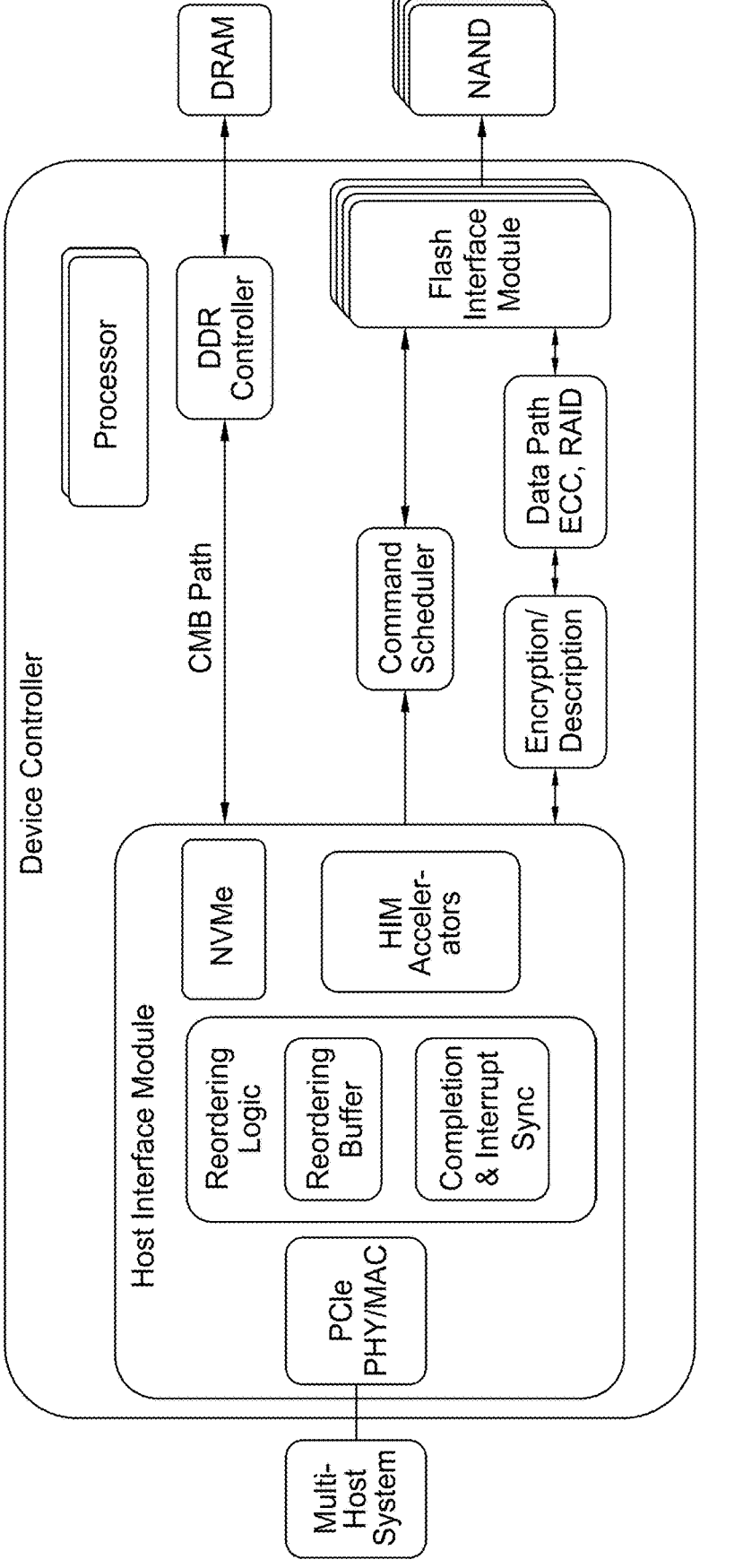
FIG. 4 is a schematic illustration of a data storage system according to one embodiment.

FIG. 4 illustrates a high-level block diagram of the data storage system that implements the disclosure. FIG. 4 is a schematic illustration 400 of a data storage system according to one embodiment. FIG. 4 shows the reordering logic within the host interface module (HIM) of the controller. The reordering logic is responsible for classifying the transactions and sending the transactions in a different order to the host devices so the traffic on all host device interfaces can be balanced. The reordering logic performs the balancing using the reordering buffer by reordering the transfers to achieve the balance on the interface in order to maximize the performance. Additionally, the completion and interrupt sync logic is responsible for the internal completion and interrupt messages, holding the messages internally, and sending the messages out to the host devices only after completing the data transfers associated with those messages.

More specifically with regards to FIG. 4, on one side there is a plurality of host devices of a multi-host system and on the other side there is the data storage device having a memory device (e.g., NAND or DRAM) and the device controller which is responsible for the interaction between the host device and the memory device. The HIM includes reordering logic that includes a reordering buffer and a completion and interrupt sync module.

With regards to the balancing, there are two main parts that will be discussed. The first part is the reordering buffer and the other part is the completion and the interrupt sync which will be discussed further in regards to FIG. 5. The balance could be based on several items such as namespace ID such that the data storage device will make sure that there is fairness per namespace. Another possibility is the balancing could be per zone ID in the memory device, per submission queue, or per completion queue. The balance could be per physical or virtual functions. The balance could be based on LBAs. The aforementioned are merely examples as other basis for the balancing are contemplated. In order to achieve fairness, the balancing needs to be based on something.

Figure 5:
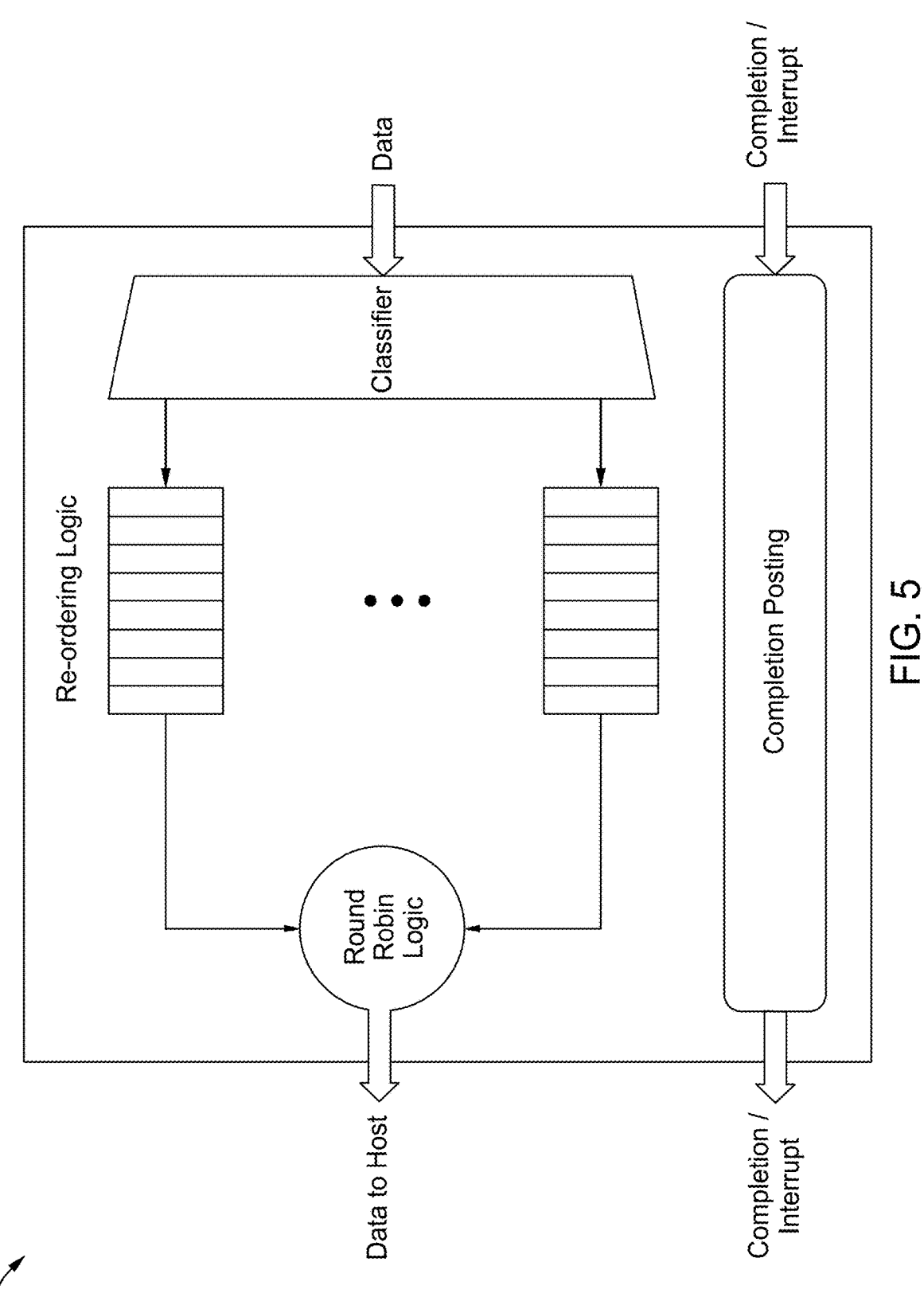
FIG. 5 is a schematic illustration of a re-order logic arrangement according to one embodiment.

FIG. 5 depicts the re-ordering logic in detail. FIG. 5 is a schematic illustration 500 of a re-order logic arrangement according to one embodiment. All the components in the device controller remain the same. There is the encryption and decryption, the data path, the direct memory access (DMA), the flash interface logic, and so on. The NVMe component sends data transactions to the re-ordering logic. The re-ordering logic parses the transactions, classifies the transactions, and queues the transactions in the appropriate queues. The round robin logic is responsible for pulling out entries from the queues and sending the entries out to the host devices in a fairness manner.

The classifications could be based on the following parameters: namespace ID; zone ID in a ZNS drive; submission and completion IDs; PCIe physical and virtual functions; and/or host device addresses. Other parameters are also contemplated.

Based upon the classification, the data is placed in a particular queue. For example, one queue could be namespace ID queue, another queue could be based on submission queue. For each transfer type there can be a queue and the classifier is responsible for classifying the type of the packet and then queueing in the appropriate queue. Only then will the round robin algorithm or something like that be used to balance. The round robin could be weighted.

The other part of the logic is for the completion which includes the completion queue and interrupt posting to the host device. Special care should be taken for those transfers because the logic reorders the transfers and thus it cannot be assumed that a packet has been sent so that a completion can be sent to the host device. Such is not allowed in this case because there might be a scenario that the order logic will decide to reorder the transfer and it will take time until the logic decides to transfer the packet to the host device and therefore the completion posting logic should be aware.

The data transfer associated with the command is delayed and therefore also the completion message associated with the command should be delayed. Otherwise there might be a race condition, and therefore, the logic is responsible for the synchronization. The reordering buffer adds a delay before submitting the data to a host device while the NVMe logic assumes that the data is already transmitted. Therefore, the NVMe logic may transmit completion and interrupt messages but the reordering logic could not transmit the messages immediately the host device. The logic keeps track of the relevant data and only when completing the data transfer associated with a command will the completion/interrupt messages be transmitted to the host device.

Figure 6:
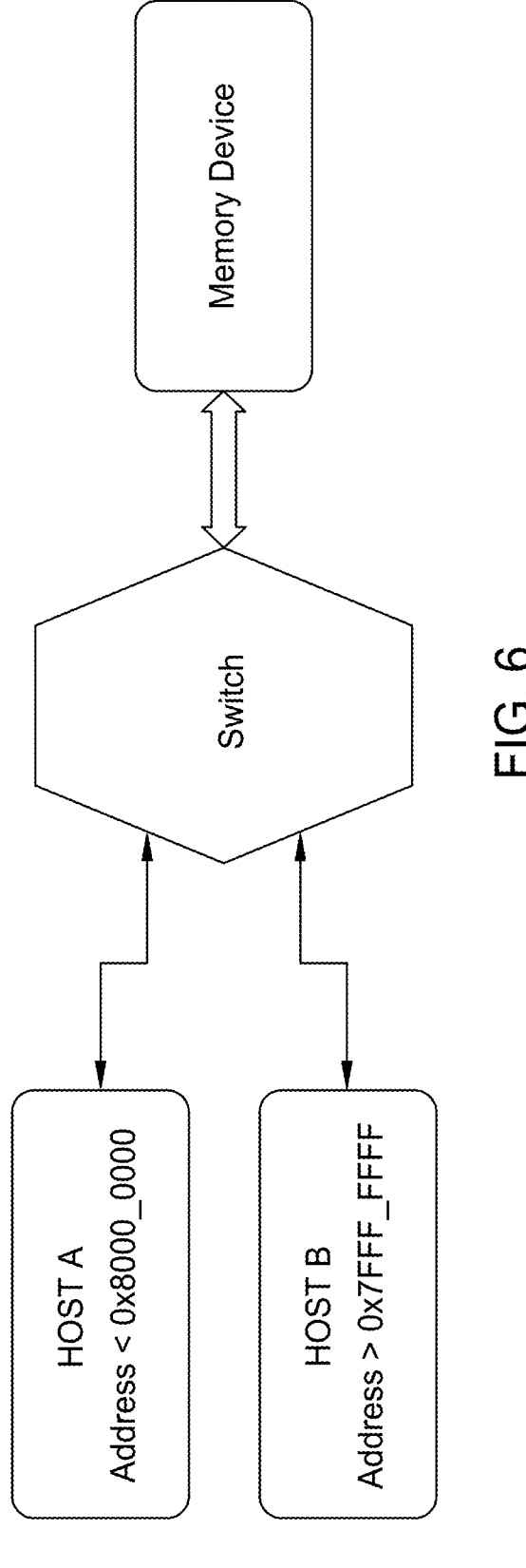
FIG. 6 is a schematic illustration of a two host system according to one embodiment.

An example will now be described where fairness is based on host device addresses. It is to be understood that host device addresses is merely an example and other basis may be used for determining fairness. Additionally, the host memory space is 32-bit while half is allocated to Host A and the other half to Host B. The memory device is responsible for the balancing the packets between those host devices in packet granularity. FIG. 6 presents the example. FIG. 6 is a schematic illustration 600 of a two host system according to one embodiment. Taken in conjunction with Tables I and II, there is an example for fairness based on LBA.

In the example, Host A will be responsible for the higher addresses, and Host B will be responsible for the lower addresses. For the example, there is a need to transfer 1K from an address to Host A and Table I shows the order of the transfers that the internal logic implemented and the device controller wants to send to the host device. Thus, Table I shows the internal order before the reordering logic.

TABLE I

| Address | Size | Destination |
|---|---|---|
| 0xA000 | 1K-bytes | Host A |
| 0xA400 | 1K-bytes | Host A |
| 0xA800 | 1K-bytes | Host A |
| 0xAC00 | 1K-bytes | Host A |
| 0x8000_0000 | 1K-bytes | Host B |
| 0x8000_0400 | 1K-bytes | Host B |
| 0x8000_0800 | 1K-bytes | Host B |
| 0x8000_0C00 | 1K-bytes | Host B |

Table I shows the traffic that the NVMe component sends to the reordering buffer. Four addresses are associated with Host A and then four addresses that are associated with Host B. What will happen in the scenario is that all those packets in the order shown in Table I will be sent to Host A, and Host A will be saturated, while Host B will be idle which is not good. The transfer is not balanced in the packet level for Table I since 4 KB transactions are posted to Host A and only then 4 KB transactions are posted to Host B. Previously, Table I would be the traffic that would be monitored on the host device interface.

A better approach is to reorder as shown in Table II. Table II shows the balanced traffic visible to the host device after passing through the reordering logic. The logic is responsible for reordering. After the reordering, the first packet would go to Host A and then then the second packet would go towards Host B and so on. By such a process, it is possible to make sure that the interfaces are utilized to maximize the performance. As can be seen, the fairness is achieved in packet granularity in Table II while Table I does not achieve fairness in packet granularity.

TABLE II

| Address | Size | Destination |
|---|---|---|
| 0xA000 | 1K-bytes | Host A |
| 0x8000_0000 | 1K-bytes | Host B |
| 0xA400 | 1K-bytes | Host A |
| 0x8000_0400 | 1K-bytes | Host B |
| 0xA800 | 1K-bytes | Host A |
| 0x8000_0800 | 1K-bytes | Host B |
| 0xAC00 | 1K-bytes | Host A |
| 0x8000_0C00 | 1K-bytes | Host B |

In yet another embodiment, the fairness granularity could be configured e.g. packet granularity, transfer size, etc. The 1K-byte transfer size is merely an example.

Figure 7:
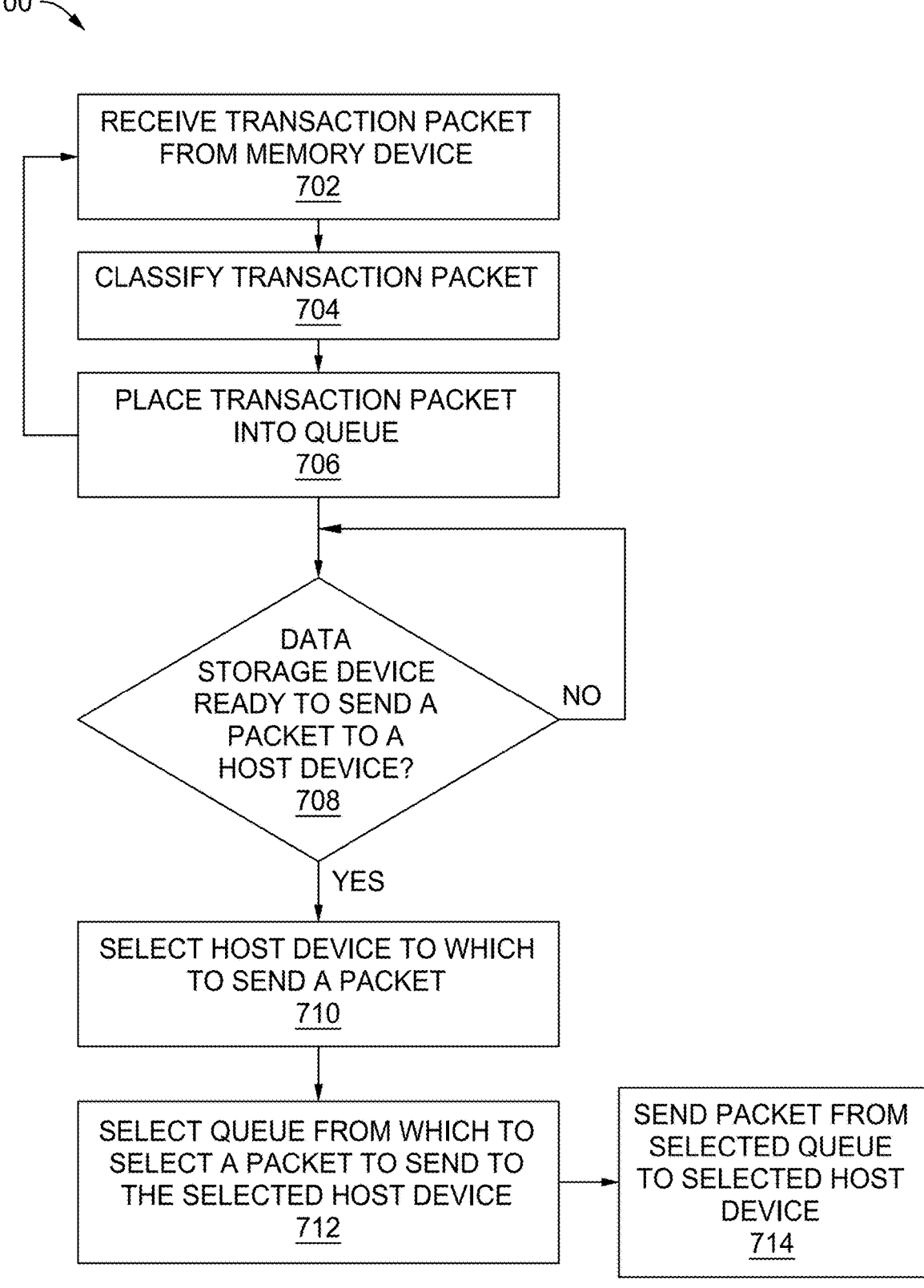
FIG. 7 is flowchart illustrating a transaction balancing process according to one embodiment.

FIG. 7 is flowchart 700 illustrating a transaction balancing process according to one embodiment. The process involves receiving a transaction packet from the memory device at block 702 followed by classifying the transaction pack at block 704, and placing the transaction packet into a queue at block 706. Blocks 702, 704, and 706 continuously repeat as more transaction packets are received from the memory device. Once any packets are in a queue, the data storage device determines whether the controller is ready to send a packet to any host device at block 708. The determination involves determining whether any interface between a host device and the controller is available to transmit a packet. If there are no interfaces available, then block 708 continues in a loop. If there is at least one interface that is ready, then the controller selects which interface is ready by selecting which host device to which a packet will be sent at block 710. The appropriate queue for the selected host device is then selected at block 712 followed by sending the selected packet from the selected queue to the selected host device at block 714.

Fairness in packet level that enables the integration of asymmetric systems is achieved by balancing. The balancing occurs by saturating the host interfaces. Balancing transmission over an interface optimizes performance, maintains reliability, and supports scalability.

In one embodiment, a data storage device comprises: a memory device; and a controller coupled to the memory device, wherein the controller is configured to: classify transactions that are to be sent to one or more host devices, wherein the transactions are at a packet level; re-order the transactions based upon the classifications; and transmit the re-ordered transactions to the one or more host devices. The classifying is based on one or more of: namespace identification (ID), zone ID, submission ID, completion ID, peripheral component interconnect (PCI) express (PCIe) physical function, PCIe virtual function, and host device address. The re-ordering comprises placing the classified transactions into different queues. The controller is configured to select a queue from the different queues for the transmitting. The controller is configured to delay posting a completion of a command corresponding to a transaction until after the transaction for the command has been transmitted. The one or more host devices is a plurality of host devices and wherein the controller is configured to ensure interfaces between the controller and the plurality of host devices are saturated. The controller comprises a host interface module (HIM) and wherein the HIM comprises a re-ordering buffer and a completion and interrupt sync module. The re-ordering buffer utilizes a round robin technique to determine when the re-ordered transactions are transmitted. The re-ordering buffer is configured to add a delay before transmitting a re-ordered transaction to a host device. The one or more host devices comprises a plurality of host devices and wherein a first host device of the plurality of host devices has a different saturation level compared with a second host device of the plurality of host devices.

In another embodiment, a data storage device comprises: a memory device; and a controller coupled to the memory device, wherein the controller comprises: a host interface module (HIM) comprising a re-ordering buffer and a completion and interrupt sync module, wherein the HIM is configured to maintain a first interface between the controller and a first host device, wherein the HIM is configured to maintain a second interface between the controller and a second host device; a flash interface module (FIM) coupled to the memory device; and a command scheduler coupled between the HIM and FIM, wherein the controller is configured to: balance traffic between the first host device and the second host device, wherein the balancing comprises ensuring that the first interface and the second interface are saturated. The first interface and the second interface are asymmetric. The controller is configured to synchronize completion and interrupt messages towards the first host device and the second host device. The first host device is a physical function and the second host device is a virtual function. The re-ordering buffer is configured to maintain a plurality of queues for placement of classified transactions.

The re-ordering buffer is configured to add a delay before transmitting data to the first host device or the second host device. The completion and interrupt sync module is configured to track data transfers over the first interface and the second interface to avoid race conditions.

In another embodiment, a data storage device comprises: means to store data; and a controller coupled to the means to store data, wherein the controller is configured to: receive a transaction packet from the means to storage data; classify the transaction packet; place the transaction packet in a queue of a plurality of queues; send the transaction packet to a host device; and maintain saturation on an interface between the controller and the host device and interfaces between the controller and other host devices. The controller is configured to determine which host device of the host device and other host devices should be sent data. The controller is configured to select from which queue of the plurality of queues data should be sent.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device; and
a controller coupled to the memory device, wherein the controller is configured to:
classify transactions that are to be sent to one or more host devices,
wherein the transactions are at a packet level
re-order the transactions based upon the classifications;
transmit the re-ordered transactions to the one or more host devices,
wherein the one or more host devices is a plurality of host devices; and
ensure interfaces between the controller and the plurality of host devices are saturated.
2. The data storage device of claim 1, wherein the classifying is based on one or more of: namespace identification (ID), zone ID, submission ID, completion ID, peripheral component interconnect (PCI) express (PCIe) physical function, PCIe virtual function, and host device address.
3. The data storage device of claim 1, wherein the re-ordering comprises placing the classified transactions into different queues.
4. The data storage device of claim 3, wherein the controller is configured to select a queue from the different queues for the transmitting.
5. The data storage device of claim 4, wherein the controller is configured to delay posting a completion of a command corresponding to a transaction until after the transaction for the command has been transmitted.
6. The data storage device of claim 1, wherein the controller comprises a host interface module (HIM) and wherein the HIM comprises a re-ordering buffer and a completion and interrupt sync module.
7. The data storage device of claim 6, wherein the re-ordering buffer utilizes a round robin technique to determine when the re-ordered transactions are transmitted.
8. The data storage device of claim 7, wherein the re-ordering buffer is configured to add a delay before transmitting a re-ordered transaction to a host device.

9. The data storage device of claim 1, wherein a first host device of the plurality of host devices has a different saturation level compared with a second host device of the plurality of host devices.

10. A data storage device, comprising:

a memory device; and a controller coupled to the memory device, wherein the controller comprises:

a host interface module (HIM) comprising a re-ordering buffer and a completion and interrupt sync module, wherein the HIM is configured to maintain a first interface between the controller and a first host device, wherein the HIM is configured to maintain a second interface between the controller and a second host device;

a flash interface module (FIM) coupled to the memory device; and a command scheduler coupled between the HIM and FIM, wherein the controller is configured to:

balance traffic between the first host device and the second host device, wherein the balancing comprises ensuring that the first interface and the second interface are saturated.

11. The data storage device of claim 10, wherein the first interface and the second interface are asymmetric.

12. The data storage device of claim 10, wherein the controller is configured to synchronize completion and interrupt messages towards the first host device and the second host device.

13. The data storage device of claim 10, wherein the first host device is a physical function and the second host device is a virtual function.

14. The data storage device of claim 10, wherein the re-ordering buffer is configured to maintain a plurality of queues for placement of classified transactions.

15. The data storage device of claim 10, wherein the re-ordering buffer is configured to add a delay before transmitting data to the first host device or the second host device.

16. The data storage device of claim 10, wherein the completion and interrupt sync module is configured to track data transfers over the first interface and the second interface to avoid race conditions.

17. A data storage device, comprising:

means to store data; and a controller coupled to the means to store data, wherein the controller is configured to:

receive a transaction packet from the means to store data;

classify the transaction packet;

place the transaction packet in a queue of a plurality of queues;

send the transaction packet to a host device; and maintain saturation on an interface between the controller and the host device and interfaces between the controller and other host devices.

18. The data storage device of claim 17, wherein the controller is configured to determine which host device of the host device and other host devices should be sent data.

19. The data storage device of claim 18, wherein the controller is configured to select from which queue of the plurality of queues data should be sent.

* * * * *